Aug. 21, 1923.  
E. H. W. WEIBULL  
1,465,700  
METHOD OF MANUFACTURING BALL OR ROLLER CAGES FOR  
ANTIFRICTION THRUST BEARINGS  
Filed Oct. 19, 1920  
2 Sheets-Sheet 1

Aug. 21, 1923.　　　　　　　　　　　　　　1,465,700
E. H. W. WEIBULL
METHOD OF MANUFACTURING BALL OR ROLLER CAGES FOR
ANTIFRICTION THRUST BEARINGS
Filed Oct. 19, 1920　　　2 Sheets-Sheet 2
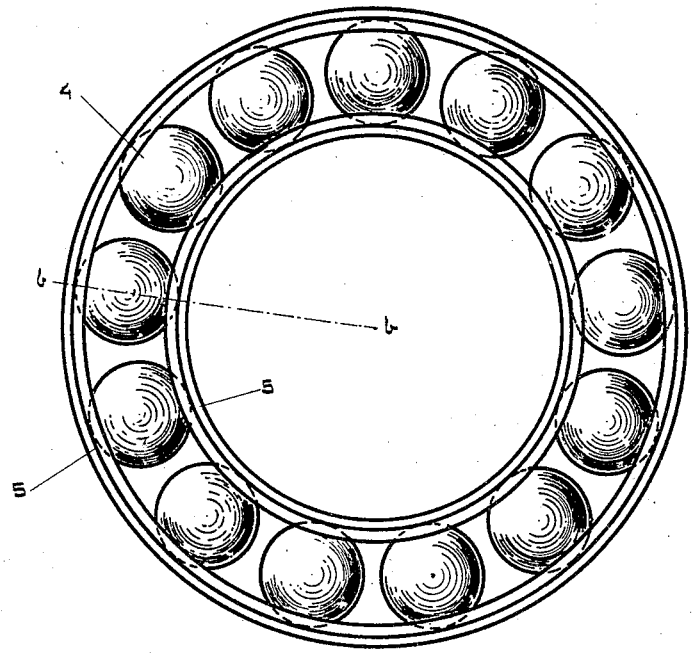
FIG.6.
FIG.7.
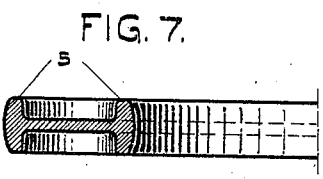
FIG.8.
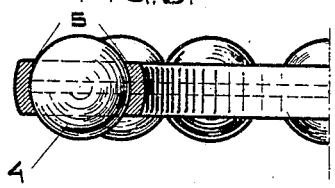
FIG.9.
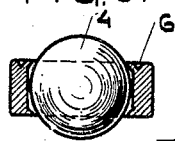
Inventor
E.H.W.Weibull,
By H. R. Kerslake.
Attorney Patented Aug. 21, 1923.

1,465,700

UNITED STATES PATENT OFFICE.

ERNST HJALMAR WALODDI WEIBULL, OF GOTTENBORG, SWEDEN, ASSIGNOR, BY MESNE ASSIGNMENTS, TO NYA NORDISKA KULLAGER AKTIEBOLAGET, OF GOTTENBORG, SWEDEN.

METHOD OF MANUFACTURING BALL OR ROLLER CAGES FOR ANTIFRICTION THRUST BEARINGS.

Application filed October 19, 1920. Serial No. 418,039.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented a new and useful Improved Method of Manufacturing Ball or Roller Cages for Antifriction Thrust Bearings, of which the following is a specification.

The present invention refers to a method of manufacturing ball or roller cages for antifriction thrust bearings. This method of producing cages is chiefly characterized therein, that the cage is stamped or else properly pressed to the form required out of the primary material, thus avoiding all expensive and time-wasting turning and drilling-operations. A further object of the invention is an improved ball or roller cage manufactured in the way now to be described.

The accompanying drawings show different phases of the cage metal before and after the operation and further drawings show various types of ball cages made according to the invention and such as may be manufactured in this way.

Figs. 4 and 5 are sectional views through the cage along the line *a—a* of Fig. 3, Fig. 4 thus showing the state of the cage before its perforation to get locations for the balls, while Fig. 5 shows a completed cage with balls mounted therein.

Fig. 6 is another embodiment of a cage according to this invention and

Figure 4:
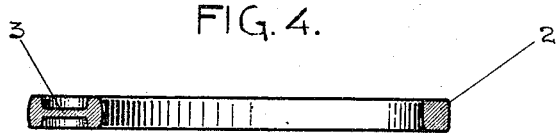
Figure 5:
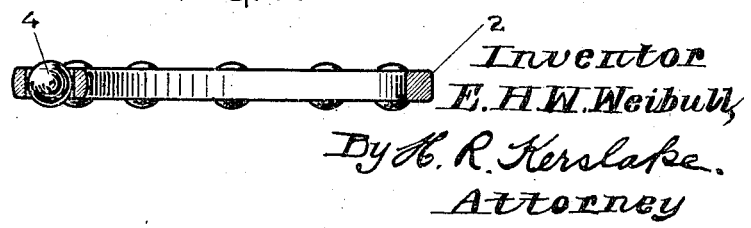

Figs. 7 and 8 respectively are sectional views along the line *b—b* transversely across the cage as in Fig. 6 under similar circumstances as regards the showing in Figs. 4 and 5 respectively.

Fig. 9 is a sectional detail of the modified form of cage.

Figure 1:
Fig. 1 is a cross sectional view of a piece of cage material.
Figure 2:
Fig. 2 is a similar view through another piece of cage material of different cross sectional form.

According to Figures 1 and 2, the cage material consists of a piece of metal of rectangular, or other shape in cross section. This material is shaped or curved to form spherical rings and the ends are suitably fastened together unless the metal has this form from the start. Out of this ring shaped material the cage is afterwards stamped or else properly pressed according to the invention in a proper machine giving the form required.

Figure 3:
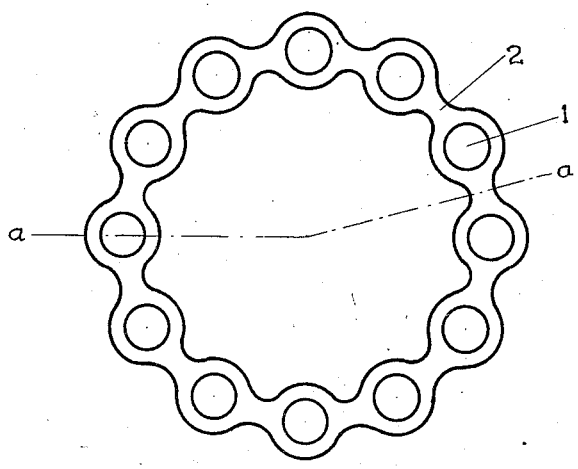
Fig. 3 is a front elevation of a cage.

Fig. 3 is an embodiment of a cage obtained in this way.

1 indicates holes for the balls and 2 are compressions made between the locations of the balls, thereby effecting a considerable saving of material, which is only possible by means of this invention. The punching of the holes in the cage material in order to procure locations for the rolling bodies may take place simultaneously with the stamping or pressing operation or immediately after the completion of such operation. A sectional view of the cage subsequent to stamping as effected in the separate stamping and punching operation will be noted upon reference to Fig. 4 wherein the numeral 3 denotes the material to be removed by another stamping or pressing process in order to obtain the locations 1 for the balls 4 as seen in Figs. 3 and 5. According to the modification shown at Figures 6 to 8 the ring is given the form of an H-section, and the edges 5 are bent around the balls, the latter being first enlodged in their locations.

Fig. 9 shows a cage having the edges of the ball-locations beaten down at the point 6 and bent over the balls in order to keep them in their positions.

It is evident, that primary material of any other shape may be used and other types of cages than illustrated herein may be produced according to the invention, and further that cages made in the manner described may also be used for roller-bearings or similar bearings.

What I claim is:—

An improved method for manufacturing ball or roller cages consisting in first shaping a piece of cage material of suitable shape in cross section into a ring like form in plan, then stamping the ring like element in a direction at right angles to the longitudinal axis of the element to flatten the same, and punching the element at suitably spaced distances to provide openings therein.

In testimony whereof I have affixed my signature.

ERNST HJALMAR WALODDI WEIBULL.